Oct. 24, 1933.                M. L. MacRAE                1,932,281
                           WELDING APPARATUS
                          Filed April 30, 1932
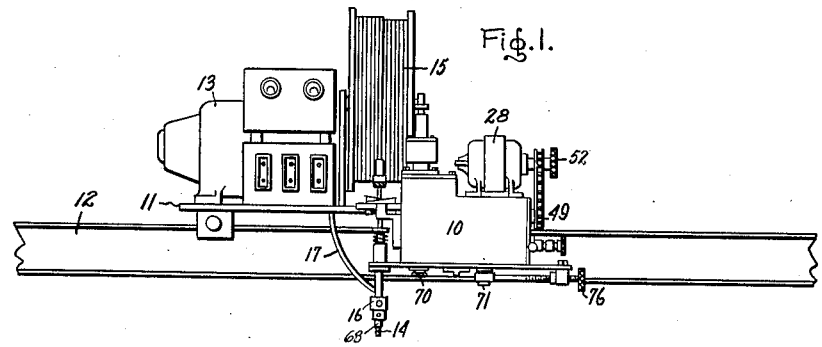
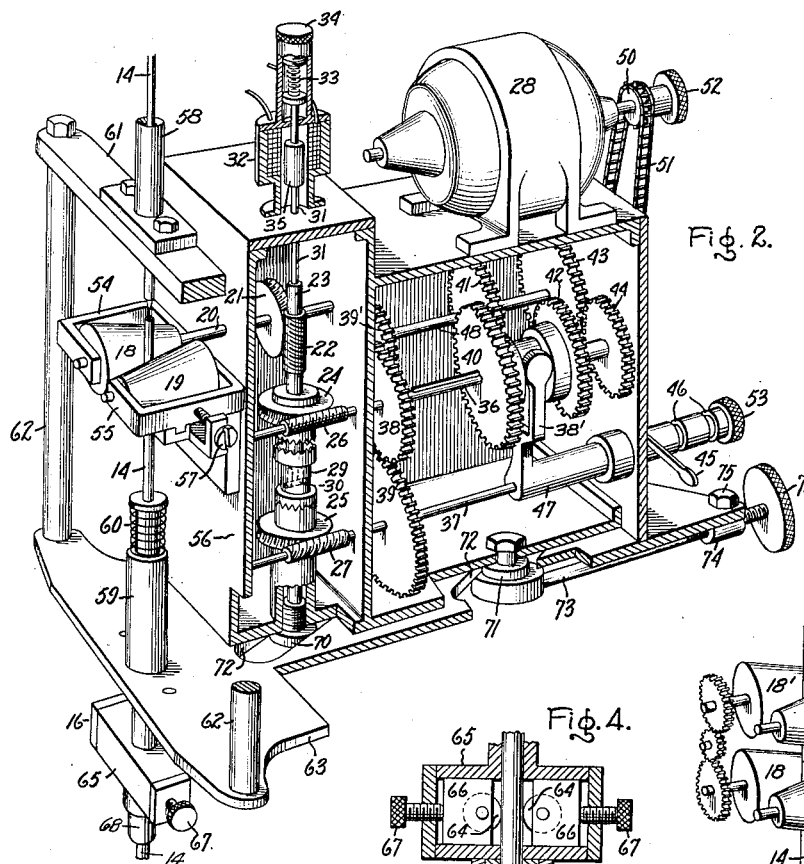
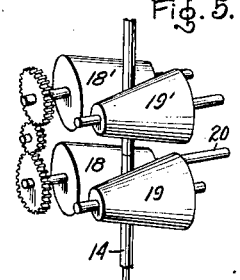
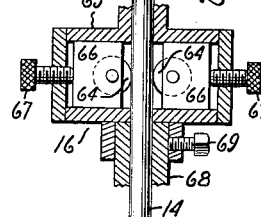
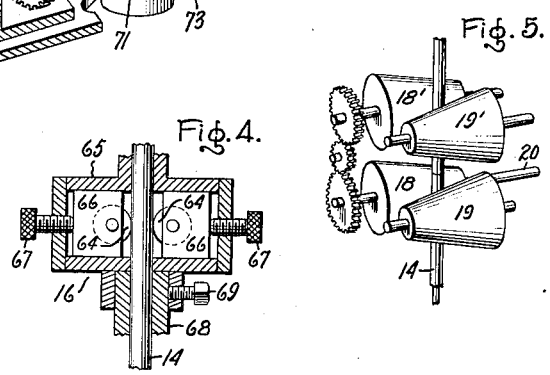
Inventor:
Mungo L. MacRae,
by Chas. E. Tullar
His Attorney.

Patented Oct. 24, 1933

1,932,281

UNITED STATES PATENT OFFICE 1,932,281

WELDING APPARATUS

Mungo L. MacRae, Schenectady, N. Y., assignor to General Electric Company, a corporation of New York Application April 30, 1932. Serial No. 608,454

9 Claims. (Cl. 219—8)

My invention relates to welding apparatus, and more particularly to means for feeding a weld rod at adjustable speeds.

It is an object of my invention to provide a feeding mechanism in which a speed adjustment is obtained directly on the weld rod.

It is a further object of my invention to provide means for feeding the end-portion of a weld rod that has passed from the feeding means through the agency of a following weld rod which is under the control of the feeding means.

Further objects of my invention will become apparent from a consideration of the following specification taken in connection with the accompanying drawing, Fig. 1 of which illustrates my invention as applied to arc welding apparatus for feeding electrode material toward and away from the work to strike and thereafter maintain a welding arc, Fig. 2 of which is a perspective view partly in section illustrating the construction of the apparatus shown in Fig. 1, Figs. 3 and 4 of which are detailed views of parts of the apparatus of Figs. 1 and 2, and Fig. 5 of which is a perspective view of an arrangement using a plurality of sets of feed rolls.

In Fig. 1 a welding head 10 embodying my invention is supported on a travel carriage 11 mounted on a track 12 along which it is propelled by traversing motor 13. The parts illustrated in Fig. 1 form part of an automatic arc welding machine in which the work is supported beneath the track 12 and held in place by clamping means not shown in the drawing. Electrode material 14 is fed by the welding head 10 from a source of supply 15 to strike and thereafter maintain a welding arc as will be more fully described below. Current is supplied to the electrode 14 through the agency of a nozzle 16 which is connected by conductor 17 to a source of welding current.

As shown in Fig. 2 conical feed rolls 18 and 19 are used for feeding the electrode 14 toward and away from the work. The surfaces of these feed rolls may be plain or they may be corrugated or covered with a material that will insure a positive driving engagement between them and the electrode which they feed. Feed roll 18 is connected by a shaft 20 to a worm wheel 21 which is rotated in opposite directions by means of a worm 22. This worm is attached to a hollow shaft 23 on which are supported worm wheels 24 and 25. These worm wheels are rotated in opposite directions by means of worms 26 and 27 which are connected through gearing described below to a feed motor 28. Worm wheels 24 and 25 are mounted for free rotation on shaft 23 and are connected thereto by means of a clutch, the movable element 29 of which is provided with toothed surfaces for engaging corresponding toothed surfaces on the worm wheels 24 and 25. The movable clutch element 29 is connected by a pin 30 to a small rod 31 which extends through the hollow shaft 23. This pin also acts as a driving connection between the shaft 23 and element 29 of the clutch, an elongated opening being provided in the shaft to permit longitudinal movement of the element 29 thereon so that its clutch surfaces may be brought into engagement with the corresponding clutch surfaces of worms 24 and 25. The direction of rotation of the feed roll 18 is determined by the position of the clutch element 29 on shaft 23 which in turn depends upon the movement imparted to the rod 31 by a relay 32 whose coil is connected to the welding circuit in such manner as to be responsive to a characteristic thereof. The operating rod 31 is biased to a position in which the movable clutch element 29 engages worm wheel 25 by a spring 33, the tension of which may be adjusted by a screw 34. The clutch 29 is moved from this position into engagement with worm wheel 24 by the pull exerted on rod 31 through the action of the coil of relay 32 on its armature 35. Preferably armature 35 of relay 32 is connected to rod 31 by means of a swivel joint and is held in suitable guides in order to prevent its rotation along with the rod 31.

Worm wheels 26 and 27 above referred to are mounted on shafts 36 and 37 which are connected by intermeshing gears 38 and 39 mounted on these shafts. Shaft 36 is rotated by a set of sliding gears keyed thereto and adjusted to predetermined positions thereon by means of a shifting fork 38', so that gears 39' and 40, 41 and 42, and 43 and 44 may be brought into engagement with one another when moved to three positions determined by the engagement of lever 45 with slots 46 in its operating member 47. This member is hollow and constitutes a bearing for shaft 37. Gears 39', 41 and 43 are supported on a shaft 48 which is connected by sprockets 49 and 50 and chain 51 to the shaft of feed motor 28. This shaft is also provided with a hand-wheel 52 by means of which the gears may be manually rotated a slight amount without connecting the feed motor 28 to a source of supply for accomplishing this result. Operating member 47 for shifting fork 38' is also provided with a hand-wheel 53 for moving it to predetermined positions in order to determine the gear reduction between feed motor 28 and worms 26 and 27.

In the arrangements illustrated in the drawing feed rolls 18 and 19 are supported in yokes 54 and 55 which are attached to the framework 56 containing the gearing above described. Feed roll 19 is an idling roll and is employed for holding the electrode 14 in driving engagement with feed roll 18. This adjustment is accomplished through the agency of an adjusting screw 57 by means of which feed roll 19 is forced into engagement with the electrode through the action of this screw on its supporting yoke 55.

Electrode material is directed toward and from the feed rolls by guides 58 and 16, which latter constitutes the nozzle above referred to. This nozzle is supported in a flanged socket 59 and biased toward the feed rolls 18 and 19 by a spring 60 inserted between the upper end-portions of these members. Guide 58 is mounted on a bar 61 which is supported at its ends by columns 62 on a plate 63 which also furnishes a support for the flanged socket 59. Nozzle 16 is provided with a plurality of friction rolls 64 contained within a casing 65 forming part of the nozzle 16. This arrangement of parts is shown in detail in Fig. 4. As there illustrated the friction rolls 64 are mounted in blocks 66 which may be adjusted toward and from the electrode 14 by means of set screws 67. As an electrode is fed through the nozzle 16 the frictional engagement between it and rolls 64 will displace the nozzle toward the work against the action of the biasing spring 60. Thus, when the remaining end-portion of an electrode has passed from the controlling influence of the feed rolls 18 and 19 the end to end engagement therewith by the next electrode which is under the control of the feed rolls 18 and 19 will control the feeding of this remaining end-portion. If the electrode under the control of the feed rolls is fed from the work the electrode in the nozzle will also be fed from the work due to the upward displacement of the nozzle under the action of spring 60. If the electrode under the control of the feed rolls is fed toward the work, the electrode in the nozzle will also be fed toward the work due to the end to end engagement of the electrode in the nozzle and the electrode in the feeding mechanism. In order to facilitate a continuous feeding operation of the electrodes their ends may be provided with mortises and tenons as illustrated in the drawing, although other arrangements may be employed for accomplishing this result without departing from my invention. For example, a plurality of sets of feed rolls which are geared together for simultaneous operation such as shown in Fig. 5 may be employed. With such an arrangement the first set of feed rolls 18′, 19′ engages the end of a new electrode and feeds it into engagement with the end of the preceding electrode before it has passed from between feed rolls 18, 19. Current is fed into the electrode by means of a sliding contact (not shown) within the nozzle tip 68 which is attached to nozzle 16 by a set screw 69.

In order to provide a speed adjustment directly on the weld rod, the position of the feed rolls 18 and 19 relative thereto is made adjustable. In the arrangement illustrated this is accomplished by moving the framework 56 upon which the feed rolls 18 and 19 are supported relatively to the guiding means 58 and 16. As shown in the drawing the supporting framework 56 is provided with studs 70 and 71 which are securely fastened thereto and movable in slots 72 in plate 63. Stud 71 is connected to a shaft 73 which is threaded into a swivel nut 74 attached to the plate 63 at 75. This shaft is provided with a hand-wheel 76 means of which it can be rotated to feed it through screw 74 and thereby move stud 71 and framework 56 relatively to plate 63 upon which are supported the guiding means 58 and 16 for the electrode 14. As best shown in Fig. 3 which illustrates a plan view of the plate 63, the slots 72 are diagonal slots whose side surfaces are parallel to that part of the surface of feed roll 18 which engages the electrode. Thus, by rotating hand-wheel 76 the feed roll 18 may be adjusted relatively to the electrode in order to vary its rate of electrode feed for a given rotational speed of the feed roll.

It will thus be seen that by employing conical feed rolls I provide a speed adjustment directly on the weld rod. In the arrangement illustrated in the drawing feed motor 28 is a constant speed motor and is connected to the feed roll 18 through an adjustable gear reduction and a clutch transmission through the action of which the speed of electrode feed is controlled in accordance with its rate of consumption in the welding arc. Depending upon the size of the electrode being fed the gear transmission will be adjusted in order to accomplish a speed reduction such that the clutch mechanism by infrequent operation can accomplish the desired feeding operation. Fine adjustments in this speed reduction are accomplished by adjusting the weld rod along the length of conical feed roll 18.

Although a driving arrangement employing a constant speed motor and a variable speed transmission has been described in connection with the embodiment of my invention illustrated in Fig. 2, it is to be understood that a variable speed motor directly responsive to conditions in the welding circuit may be employed for controlling the electrode feed in accordance with its consumption in the welding arc. Such arrangements are well known in the art, and since it forms no part of my invention will not be illustrated or described. It is to be understood that any driving arrangement may be employed for operating an electrode feeding means including conical feed rolls such as illustrated and described above and that such a feeding mechanism may or may not be used with a mechanism such as above described for feeding the end portion of a weld rod which is passed from the feeding means through the agency of a following rod which is under the control of the feeding means.

What I claim as new and desire to secure by Letters Patent of the United States, is,—

1. Welding apparatus comprising a conical feed roll, means for holding a weld rod in driving engagement therewith, and means for adjusting said weld rod and said feed roll relatively to one another to adjust their point of engagement along said feed roll.

2. Welding apparatus comprising a conical feed roll, a support for said feed roll, means for guiding a weld rod into driving engagement with said feed roll, a support for said guiding means, and means for moving said supports relatively to one another along a path parallel to the conical surface of said feed roll to move said weld rod and said feed roll relatively to one another to adjust their point of engagement along said feed roll.

3. Arc welding apparatus for feeding an electrode toward and away from the work to strike and thereafter maintain a welding arc comprising a conical feed roll, means for holding an electrode in driving engagement with said feed roll, means responsive to an electrical characteristic of the welding arc for controlling the speed of rotation of said feed roll and the speed of electrode feed in accordance with the consumption of the electrode in the welding arc, and means for adjusting said electrode and said feed roll relatively to one another to adjust their point of contact along said feed roll and consequently the speed of electrode feed relative to the speed of rotation of said feed roll.

4. Arc welding apparatus for successively feeding a plurality of electrodes toward and away from the work to strike and thereafter maintain a welding arc comprising means, including a conical feed roll, for feeding said electrodes, means, including a nozzle, for guiding said electrodes into driving engagement with said feed roll, means for supporting said nozzle for limited movement toward and away from said feed roll, means for feeding an electrode in said nozzle toward and away from the work coincidentally with a similar feeding movement imparted to the following electrode by said feed roll, and means for moving said feed roll and said nozzle relatively to one another along a path parallel to the conical surface of said feed roll to adjust the point of contact between said electrode and said feed roll along said feed roll.

5. Welding apparatus comprising means for successively feeding a plurality of weld rods in end to end engagement, means for supporting the end portion of a weld rod that has passed from said feeding means, and means for feeding said end portion toward and away from the work through the agency of said holding means and the following weld rod which is under the control of said feeding means.

6. Arc welding apparatus for successively feeding a plurality of electrodes toward and away from the work to strike and thereafter maintain a welding arc comprising feeding means for said electrodes, a nozzle for said electrodes, means for supporting said nozzle for limited movement toward and away from said feeding means, and means for imparting to said nozzle a limited movement toward and away from said feeding means and for feeding an electrode in said nozzle toward and away from the work coincidentally with a similar feeding movement imparted to a succeeding electrode by said feeding means.

7. Arc welding apparatus comprising means for feeding electrodes toward and away from the work to strike and thereafter maintain a welding arc, means for holding in end to end engagement the adjacent end portions of electrodes fed by said feeding means, means for supporting said holding means for limited movement toward and away from said feeding means, and means for imparting to said holding means a limited movement toward and away from said feeding means and for feeding the electrode in said holding means out of engagement with the feeding means simultaneously toward and away from the work and with the electrode in said feeding means.

8. Arc welding apparatus for successively feeding a plurality of electrodes toward and away from the work to strike and thereafter maintain a welding arc comprising feeding means for said electrodes, a nozzle constructed and arranged for simultaneously supporting the remaining end portion of an electrode that has been fed through said feeding means and the forepart of a succeeding electrode in said feeding means, means for supporting said nozzle for limiting movement toward and away from said feeding means, means for biasing said nozzle toward said feeding means, and means for frictionally engaging the remaining end portion of said leading electrode and for moving said nozzle toward the work against the action of said biasing means along with said electrodes in said nozzle.

9. Apparatus for feeding weld rods in end to end engagement comprising a plurality of feed rolls, means for supporting said rolls one behind the other in the direction of feed in simultaneous driving engagement with the weld rods, and means for simultaneously operating said rolls in the same feeding direction at the same feeding speed.

MUNGO L. MacRAE.